(12) United States Patent
Joshua et al.

(10) Patent No.: US 11,729,240 B2
(45) Date of Patent: Aug. 15, 2023

(54) FANOUT PROCESSOR

(71) Applicant: BGC PARTNERS, L.P., New York, NY (US)

(72) Inventors: Jonathan Joshua, Scotch Plains, NJ (US); Bijoy Paul, New York, NY (US)

(73) Assignee: BGC PARTNERS, L.P., New York, NY (US)

( * ) Notice: Subject to any disclaimer, the term of this patent is extended or adjusted under 35 U.S.C. 154(b) by 108 days.

(21) Appl. No.: 17/343,042

(22) Filed: Jun. 9, 2021

(65) Prior Publication Data

US 2022/0400144 A1 Dec. 15, 2022

(51) Int. Cl.
*H04L 65/75* (2022.01)
*H04L 65/612* (2022.01)
*H04L 65/65* (2022.01)
*H04L 69/163* (2022.01)

(52) U.S. Cl.
CPC .......... *H04L 65/765* (2022.05); *H04L 65/612* (2022.05); *H04L 65/65* (2022.05); *H04L 69/163* (2013.01)

(58) Field of Classification Search
CPC ..... H04L 65/765; H04L 65/612; H04L 65/65; H04L 69/163
See application file for complete search history.

(56) References Cited

U.S. PATENT DOCUMENTS

| | | | |
|---|---|---|---|
| 2013/0159449 A1* | 6/2013 | Taylor ............... | G06F 15/167 709/212 |
| 2020/0169513 A1* | 5/2020 | Goel .................. | H04L 67/61 |
| 2022/0261905 A1* | 8/2022 | Gorham ............. | G06Q 40/06 |

* cited by examiner

*Primary Examiner* — Suraj M Joshi

(57) ABSTRACT

Disclosed herein is a processor to process streaming data. The processor includes a TCP client circuit and a TCP server circuit. A fanout circuit is communicatively coupled to the TCP client circuit and the TCP server circuit. The fanout circuit receives data from the TCP client circuit, determines a rate at which to transmit the received market data, and instructs the TCP server circuit to send the received data at the determined rate.

8 Claims, 6 Drawing Sheets

FANOUT PROCESSOR

BACKGROUND

Real-time data streams may be associated with real-time sensor events, video streaming, financial trades, or the like. Such data streams may be continuously generated at various rates and may also be generated in large volumes.

DETAILED DESCRIPTION

Figure 1:
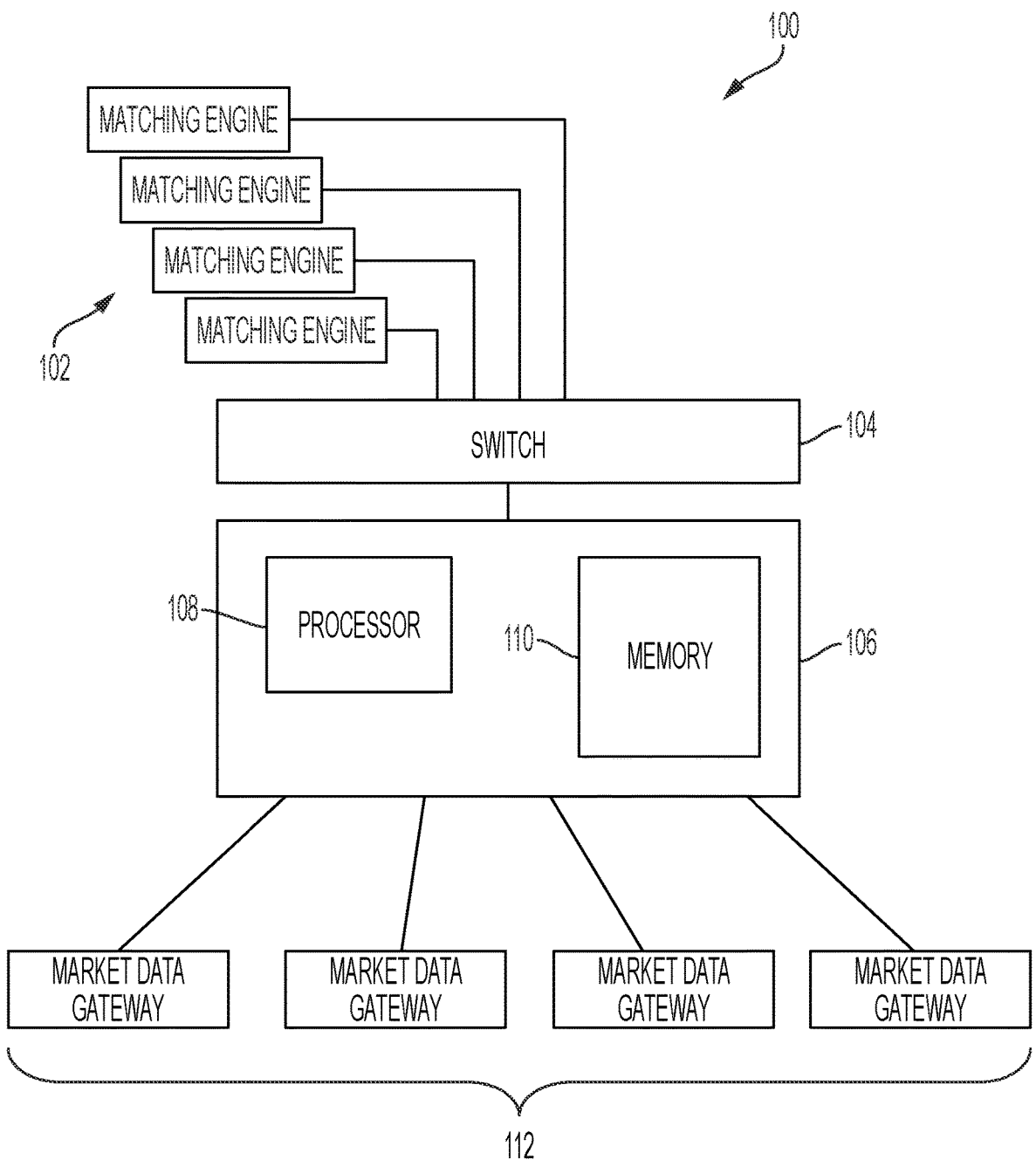
FIG. 1 is an example system in accordance with aspects of the disclosure.

As noted above, real-time data streams may include data that is continuously generated at various rates and may also be generated in large volumes. Moreover, the data may be generated from various sources and various clients may be interested in receiving this data. That is, continuous big data streams may need to be received, processed, and promptly fanned out to various destinations. For time critical applications, latency and throughput may be areas of concern. These applications may also need to address the different transmission rates of the generated data streams and the different consumption rates of the data recipients. Finally, data stream errors, such as lost data and discontinuous data may also have to be addressed. Current solutions do not address all these problems contemporaneously.

In view of the foregoing, disclosed herein is a processor or integrated circuit. The circuit may include a register, a plurality of transmission control protocol ("TCP") client circuits, each TCP client circuit may be configured to receive data from a respective data source. The processor may also comprise a plurality of TCP server circuits such that each TCP server circuit may be configured to send the received data to a respective recipient. In another example, the processor may also include a fanout circuit communicatively coupled to the TCP client circuit, the TCP server circuit, and the register. In this example, the fanout circuit may be configured or otherwise programmable to receive a plurality of data streams from the TCP client circuits. The fanout circuit may also retrieve, from the register, a plurality of transmission rates, each transmission rate may indicate a number of data messages to send per nanosecond to a given recipient; and, in another example, the fanout circuit may instruct each TCP server circuit to send the received data at a respective transmission rate retrieved from the register. Each transmission rate may be based on a rate of consumption by a respective client recipient and each transmission rate may be configurable.

In a further example, the fanout circuit may be configured to determine a respective size of a given data message to send via a respective TCP server circuit. The respective size of the given data message may be configurable. In a further example, the fanout circuit may be communicatively coupled to a fanout controller to receive configurable parameters from the fanout controller. Thus, in this example, the fanout circuit may receive at least one predetermined size of a market data message from the fanout controller and store the at least one predetermined size in the register. The fanout circuit may also be configured to receive the plurality of recipient transmission rates from the fanout controller and store the transmission rates in the register. In yet a further example, the fanout circuit may be configured to interleave the plurality of market data streams into an output stream for the plurality of TCP server circuits.

Aspects features and advantages of the present disclosure will be appreciated when considered with reference to the following description of examples and accompanying figures. The following description does not limit the application; rather, the scope of the disclosure is defined by the appended claims and equivalents.

The techniques disclosed herein may be employed in any circumstance that contains various sources of real-time streaming data and various recipients of that data. For example, the sources of data may be sensors in an internet of things ("IOT") network including, but not limited to, health device sensors, traffic device sensors, etc. Such sensors may provide a stream of event data that may be fanned out to multiple subscribers to such data. Moreover, the source of real-time streaming data may be video/audio data streamed to various destinations. Therefore, while the working examples herein are based on financial data, it is understood that these examples are merely illustrative and that the techniques may be employed in different situations.

FIG. 1 presents a schematic diagram of an illustrative network 100 that may employ the processor disclosed herein. The example network 100 may include multiple trading matching engines 102 that match buy side with sell side orders. In this example, each of the matching engines 102 may send real-time trading data to computer apparatus 106 via the switch 104. Switch 104 may be a layer 1, layer 2, or layer 3 switch. Computer apparatus 106 may comprise a device capable of processing instructions and transmitting data to and from other computers, including a laptop, a full-sized personal computer, or a high-end server. Computer apparatus 106 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 106 may also comprise a network interface to communicate with other devices over a network.

The computer apparatus 106 may also contain a processor 108, which may include the architecture disclosed herein. The disclosed architecture may be configured in a field programmable field array ("FPGA"), an application specific integrated circuit ("ASIC") or may be hardwired on a substrate. Memory 110 may store instructions that may be retrieved and executed by processor 108.

Market data gateways 112 may be the client recipients of the data originating from matching engines 102. Computer apparatus 106 may communicate with matching engines 102 and market data gateways 112 via a network that may be a local area network ("LAN"), wide area network ("WAN"), the Internet, etc. Such a network may use various protocols including virtual private networks, local Ethernet networks, private networks using communication protocols proprietary to one or more companies, cellular and wireless networks, HTTP, and various combinations of the foregoing.

Figure 2:
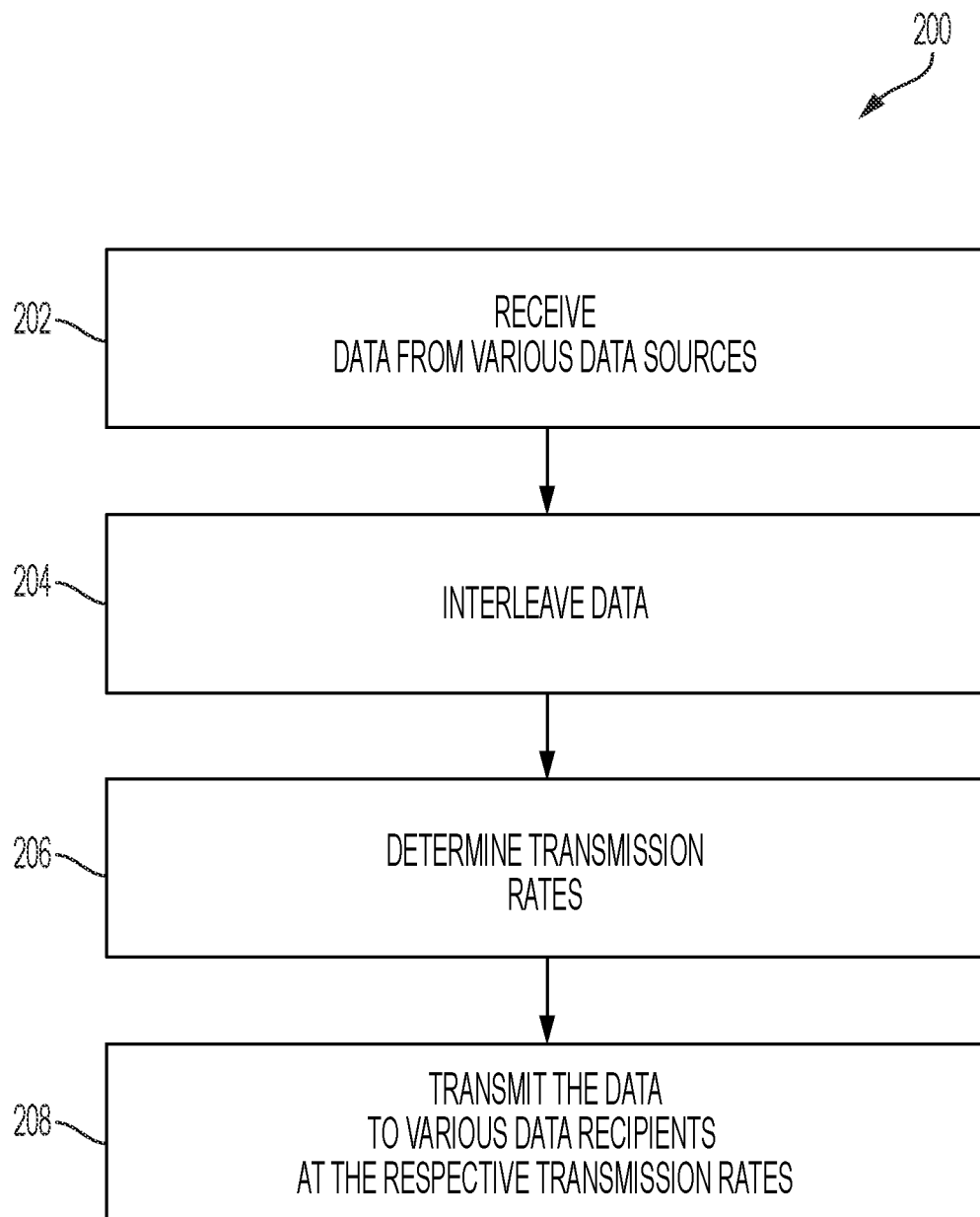
FIG. 2 is an illustrative flow diagram in accordance with aspects of the present disclosure.
Figure 3:
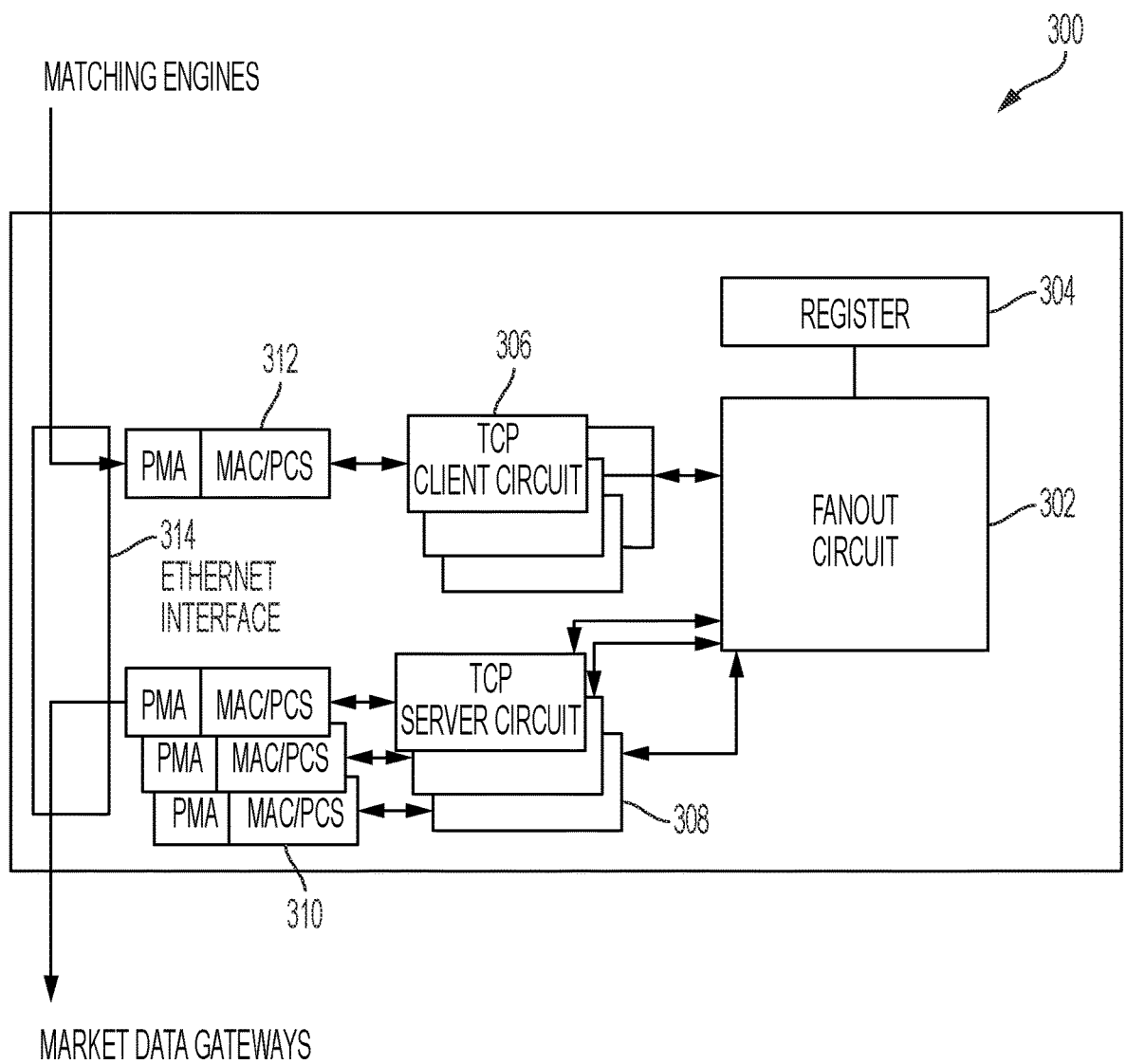
FIG. 3 is an example processor in accordance with aspects of the present disclosure.
Figure 4:
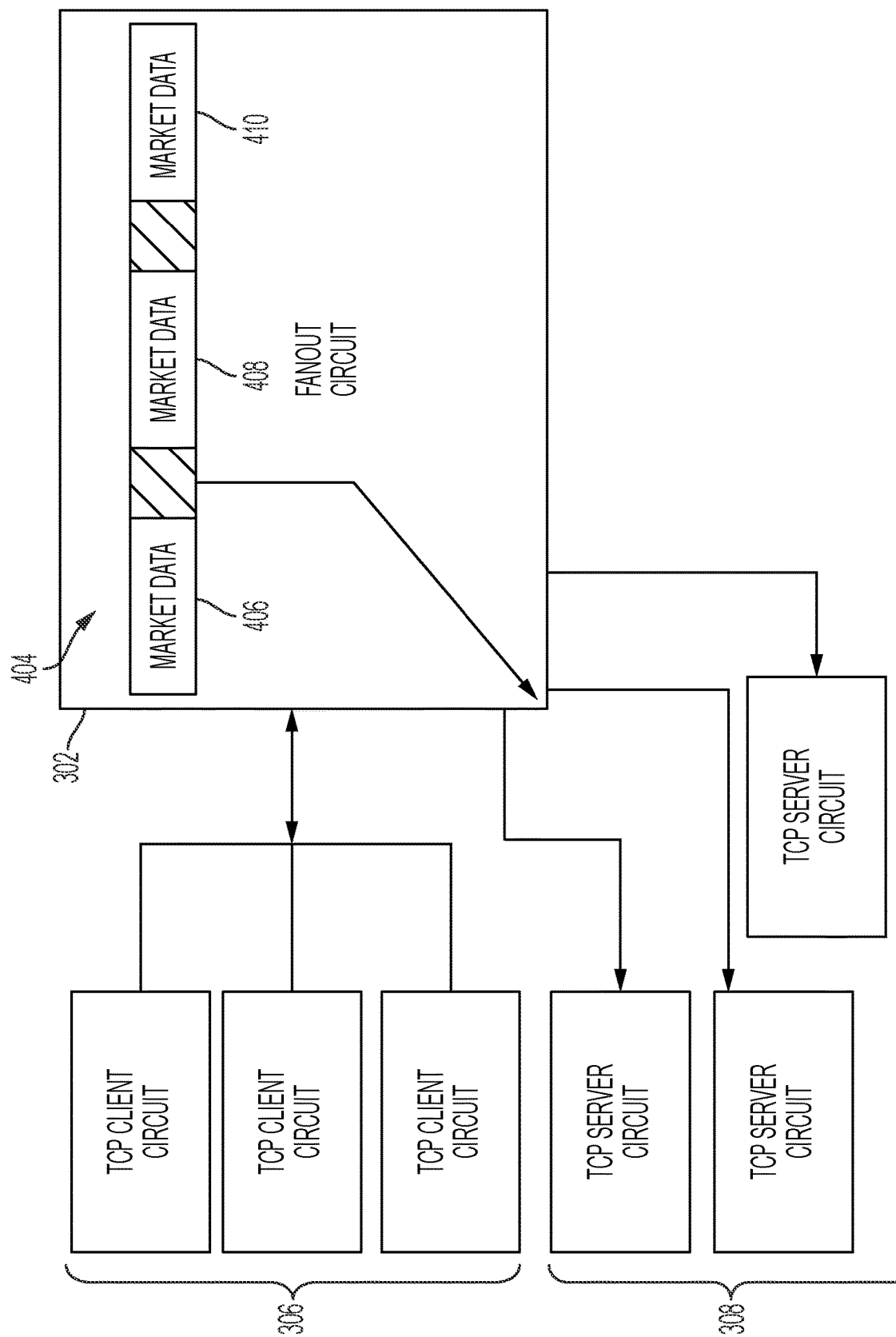
FIG. 4 is a working example of interleaving in accordance with aspects of the present disclosure.

A working example of the processor is shown in FIGS. 2-4. FIG. 2 illustrates a flow diagram 200 for receiving and fanning out streamed data. The actions shown in FIGS. 3-4 will be discussed below with regard to the flow diagram of FIG. 2.

In block 202 of FIG. 2, data may be received from various data sources. Referring now to FIG. 3, an example processor 300 is depicted. Data from the matching engines may flow into the processor via an ethernet interface 314, which may be a coaxial, twisted pair and fiber-optic physical media interface. Ethernet interface 314 may be communicatively coupled to input-sublayer 312, which may include a physical medium attachment sublayer ("PMA") and a physical coding sublayer ("PCS") that may interface a medium access control sublayer ("MAC") with the PMA. Thus, input-sublayer 312 may correspond to a physical layer and data link layer within processor 300 that may be configured to receive unstructured raw data from ethernet interface 314 and detect errors in the data.

TCP client circuits 306 may be configured to ensure that the stream of bytes received from the different sources is reliable, ordered, and error-checked. Therefore, TCP client circuits 306 and input-sublayer 312 may ensure that the data stream from the ethernet interface 314 is reliable. Each TCP client circuit may be responsible for a respective data source. For example, in FIG. 3, each TCP client circuit 306 may be associated with a respective matching engine and responsible for validating the reliability of the data from each respective matching engine.

Referring to FIG. 2, data may be interleaved as shown in block 204. Referring again to FIG. 3, fanout circuit 302 may receive a single input from the plurality of TCP client circuits 306. Each data source (e.g., each matching engine) may transmit data at different rates. In this instance, fanout circuit 302 may be configured to interleave the data. Referring to FIG. 4, an interleaving example is shown with a closeup illustration of fanout circuit 302. Fanout circuit 302 is shown having a buffer 404. The buffer 404 in this example contains market data message 406, market data message 408, and market data message 410 received from TCP client circuits 306. Fanout circuit 302 may buffer the market data records until a complete message is received. That is, the fanout circuit 302 may buffer a given market data record until a certain size of the record is received. As will be discussed further below, the size of a record may be configurable and may be stored in a register (e.g., register 304 in FIG. 3). Once a certain size of a given market data record is reached, the fanout circuit 302 may fanout that given market data record across the TCP server circuits 308.

Referring to FIG. 2, the fanout circuit 302 may determine a transmission rate for each of the TCP server circuits, as shown in block 206. Each transmission rate may indicate a number of data messages to send per nanosecond to a given recipient. Referring to FIG. 3, the transmission rates for each of the recipients may be stored in register 304. Fanout circuit 302 may retrieve the transmission rates from the register.

Referring to FIG. 2, the data may be transmitted to various data recipients at the respective transmission rates, as shown in block 208. Referring back to FIG. 3, each TCP server circuit 308 may be associated with a particular data recipient and may ensure that the outgoing data is reliable, ordered, and error checked. Fanout circuit 302 may fan out a data message received from the TCP client circuits 306 once a complete message is received (i.e., once a message reaches a configured size). Ethernet interface 314 may also be communicatively coupled to output-sublayers 310. Also, as with input-sublayer 312, each output-sublayer 310 may also include a PMA sublayer and a PCS sublayer that may interface the MAC with the PMA. Each output-sublayer 310 may correspond to a physical layer and data link layer that may be configured to transmit messages out to respective recipients via ethernet interface 314 and detect errors that may occur at the ethernet interface 314. Accordingly, each data recipient client may be associated with a dedicated output layer 310 and TCP server circuit 308. However, it is also understood that multiple data recipients may share one output-sublayer 310 and that the architecture of FIG. 3 is merely illustrative.

Referring to FIG. 4, fanout circuit 302 may fanout market data message 406, market data 408, and market data 410 on a first-in-first-out ("FIFO") basis. That is, the market data record that is first to reach the configurable size in the buffer 404, may be the first market data record that is fanned out via TCP server circuits 308. The market data records may be received at different rates from the TCP client circuits 306 and the buffer 404 may be used to accommodate the different rates. In that regard, the fanout rates for each recipient (e.g., each market data gateway) may be handled with the adjustable transmission rates as described above. Also, each TCP client circuit 308 may also include its own buffer for buffering outgoing messages. In the event the buffer of a given TCP client circuit 308 reaches capacity, this may be an indication that the recipient is unable to consume the messages at the configured transmission rate. Thus, in one example, the fanout circuit 302 may be configured to disconnect the recipient and halt any further messages when the TCP circuit buffer is full to prevent backpressure that may affect other recipients. This safety mechanism may allow an administrator to adjust the transmission rate for that recipient until it no longer causes its TCP buffer to reach maximum capacity. As noted above, some examples may allow multiple recipients to share the same output-sublayer 310. In this scenario, the recipient that is unable to keep up with the configured transmission rate may also be disconnected to prevent backpressure.

Figure 5:
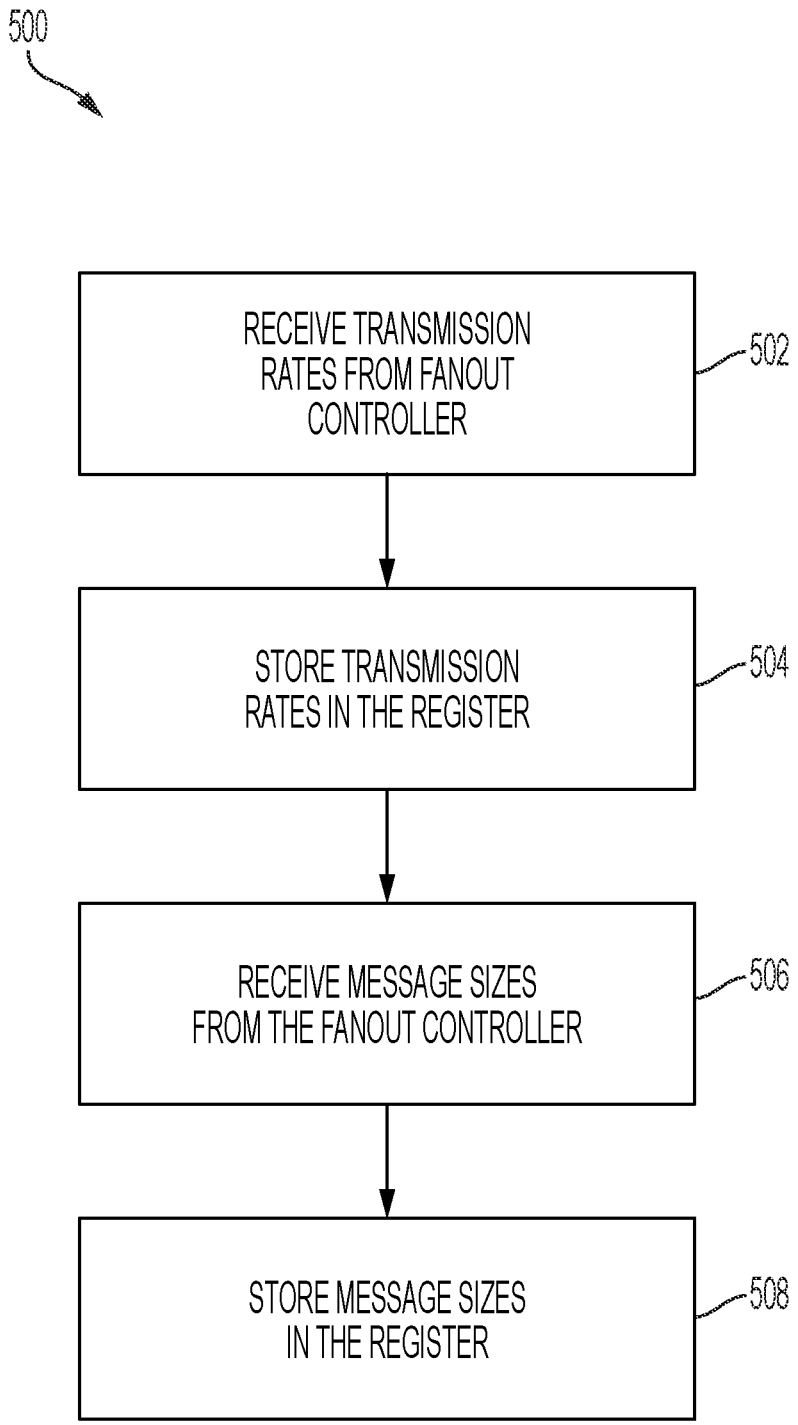
FIG. 5 is a further example flow diagram in accordance with aspects of the present disclosure.
Figure 6:
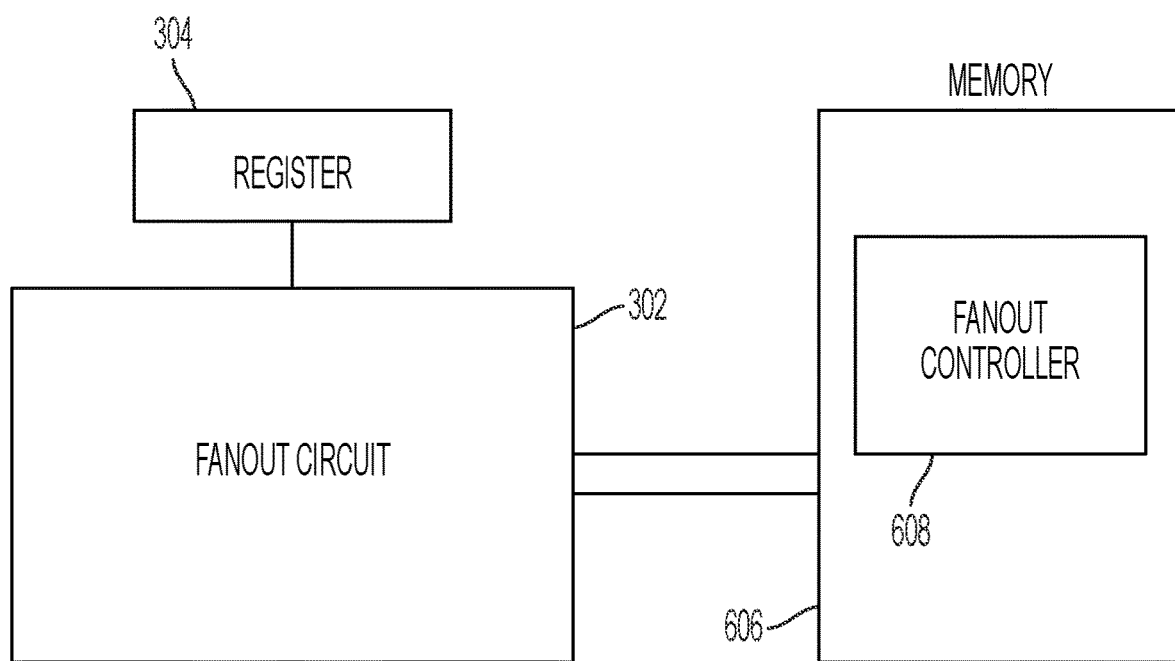
FIG. 6 is another working example in accordance with aspects of the present disclosure.

As noted earlier, the size of each data message received via the TCP client circuits may be configurable. The size may determine when the message in the buffer is ready for transmission. Furthermore, the transmission rate for each client may also be configurable. FIG. 5 is a flow diagram of an example method for configuring these parameters. FIG. 6 is a working example that corresponds to the flow diagram of FIG. 5. FIG. 5 will be discussed below in conjunction with FIG. 6.

In block 502 of FIG. 5, a transmission rate may be received from a fanout controller. Referring to FIG. 6, fanout controller 608 may comprise any set of instructions to be executed directly (such as machine code) or indirectly (such as scripts) by a processor and may reside in a memory 606. Referring back to FIG. 5, transmission rates may be stored in the register as shown in block 504. Each transmission rate may be associated with a client recipient. At block 506, the fanout circuit 302 may receive message sizes and may store the message sizes in the register at block 508. Each message size may be associated with a respective data source. The fanout circuit will be notified that a given data message is ready for transmission when the given data message reaches its configured size in the buffer.

Referring to FIG. 6, fanout controller 608 may display a user interface that allows a user to configure certain parameters that control the behavior of the processor disclosed herein. As discussed, a message size parameter may cause fanout circuit 302 to begin fanning out a given message across the TCP server circuits once the message size is reached. The transmission rate parameter may control the rate of transmission for each of the TCP server circuits'

Advantageously, the above-described processor may efficiently handle large volume data streams received from various sources at various rates by interleaving the received data and fanning out the data to multiple recipients at various rates. At the same time, the processor disclosed above addresses errors in the data being received and transmitted. In turn, throughput is maximized while errors and latency are minimized.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A programmable integrated circuit comprising:
   a register;
   a fanout circuit;
   a first transmission control protocol (TCP) client circuit being configured to receive a first stream of market data from a first trade matching engine and provide the first stream of market data to the fanout circuit;
   a second TCP client circuit being configured to receive a second stream of market data from a second trade matching engine and provide the second stream of market data to the fanout circuit;
   a first TCP server circuit being configured to receive first messages comprising market data from the first stream of market data provided by the first TCP client circuit and second messages comprising market data from the second stream of market data provided by the second TCP client circuit and providing the first messages and the second messages to a first market data gateway; and
   a second TCP server circuit being configured to receive the first messages comprising market data from the first stream of market data provided by the first TCP client circuit and the second messages comprising market data from the second stream of market data provided by the second TCP client circuit and providing the first messages and the second messages to a second market data gateway;
   wherein the fanout circuit is configured to:
   retrieve, from the register, a first number of messages to send per nanosecond to the first market data gateway and a second number of messages to send per nanosecond to the second market data gateway; and
   instruct the first TCP server circuit to send the first messages and the second messages at the first number of messages per nanosecond to the first market data gateway; and
   instruct the second TCP server circuit to send the first messages and the second messages at the second number of messages per nanosecond to the second market data gateway.

2. The programmable integrated circuit of claim 1, wherein the first number of messages and the second number of messages are configurable.

3. The programmable integrated circuit of claim 1, wherein the fanout circuit is further configured to determine a first size of the first messages and a second size of the second messages.

4. The programmable integrated circuit of claim 3, wherein the first size and the second size are configurable.

5. The programmable integrated circuit of claim 1, wherein the fanout circuit is communicatively coupled to a fanout controller to receive configurable parameters from the fanout controller.

6. The programmable integrated circuit of claim 5, wherein the fanout circuit is further configured to:
   receive a first predetermined size of a first message and a second predetermined size of a second message from the fanout controller; and
   store the first predetermined size and the second predetermined size in the register.

7. The programmable integrated circuit of claim 5, wherein the fanout circuit is further configured to:
   receive the first number of messages per nanosecond and the second number of messages per nanosecond from the fanout controller; and
   store the first number of messages per nanosecond and the second number of messages per nanosecond in the register.

8. The programmable integrated circuit of claim 3, wherein the fanout circuit is further configured to buffer the market data of the first stream until the first size is buffered and providing first messages and buffer the market data of the second stream until the second size is buffered and providing second messages.

* * * * *